US008289347B2

(12) United States Patent
DeLuca et al.

(10) Patent No.: US 8,289,347 B2
(45) Date of Patent: Oct. 16, 2012

(54) ENABLING A USER TO CHOOSE A REPRESENTATIVE LANDMARK TO DISPLAY AT A PARTICULAR ZOOM LEVEL ON A DIGITAL MAP

(75) Inventors: Lisa Seacat DeLuca, San Francisco, CA (US); Travis M. Grigsby, Austin, TX (US); Frank Lawrence Jania, Durham, NC (US); Steven Michael Miller, Research Triangle Park, NC (US)

(73) Assignee: International Business Machines Corporation, Armonk, NY (US)

( * ) Notice: Subject to any disclaimer, the term of this patent is extended or adjusted under 35 U.S.C. 154(b) by 400 days.

(21) Appl. No.: 12/511,642

(22) Filed: Jul. 29, 2009

(65) Prior Publication Data
US 2011/0025716 A1 Feb. 3, 2011

(51) Int. Cl.
*G09G 5/00* (2006.01)
(52) U.S. Cl. ........ 345/660; 345/629; 345/419; 345/427; 345/582; 701/429; 701/431; 701/533
(58) Field of Classification Search ............ 345/629, 345/660, 419–427, 582; 701/200–211, 429, 701/431, 533
See application file for complete search history.

(56) References Cited

U.S. PATENT DOCUMENTS

| 5,581,259 | A * | 12/1996 | Schipper | 342/451 |
| 6,064,941 | A * | 5/2000 | Nimura et al. | 701/210 |
| 6,427,118 | B1 * | 7/2002 | Suzuki | 701/209 |
| 6,823,495 | B1 | 11/2004 | Vedula | |
| 6,995,768 | B2 | 2/2006 | Jou | |
| 2005/0261826 | A1 * | 11/2005 | Kurosawa et al. | 701/208 |
| 2006/0069503 | A1 * | 3/2006 | Suomela et al. | 701/211 |
| 2007/0239352 | A1 | 10/2007 | Thota | |
| 2008/0147319 | A1 * | 6/2008 | Cubillo | 701/211 |
| 2008/0162031 | A1 * | 7/2008 | Okuyama et al. | 701/200 |
| 2008/0259096 | A1 | 10/2008 | Huston | |
| 2008/0288165 | A1 * | 11/2008 | Suomela et al. | 701/201 |
| 2009/0198767 | A1 * | 8/2009 | Jakobson et al. | 709/203 |
| 2010/0149399 | A1 * | 6/2010 | Mukai et al. | 348/333.02 |
| 2010/0265360 | A1 * | 10/2010 | Tsutsui | 348/231.3 |

FOREIGN PATENT DOCUMENTS

JP 2004069561 A * 3/2004

OTHER PUBLICATIONS

English Translation of JP 04-069561, Japanese Patent published on Mar. 4, 2004.*
"Garmin's StreetPilot c580," GPSInformation.Net website, Jun. 9, 2007, review by Sam Penrod, http://gpsinformation.org/penrod/gspc580/StreetPilotc580.htm.
Sciacchitano, Brain, Intelligent Library Navigation using Location-aware Systems—The Newman Project, ACM SE-06, Mar. 10-12, 2005, Melbourne, Florida, USA 1-59593-315-8/6/0004.

* cited by examiner

*Primary Examiner* — Jin-Cheng Wang
(74) *Attorney, Agent, or Firm* — Anthony V S England; Doug Lefeve

(57) ABSTRACT

A user is enabled to choose a particular landmark to display on a particular view of a digital map instead of a landmark chosen by a digital map designer. This particular landmark may then represent all landmarks that are in close proximity to each other within a geographical area on the digital map when only one of the landmarks can be displayed on that particular view of the digital map.

16 Claims, 8 Drawing Sheets

A. ESTILO
234 W. 2ND ST., AUSTIN, TX – (512) 236-0488

B. RUNTEX INC
301 W. 2ND ST., AUSTIN, TX – (512) 472-7463

C. LEGS DIAMOND WILD SHOES
202 COLORADO ST., AUSTIN, TX – (512) 477-1559

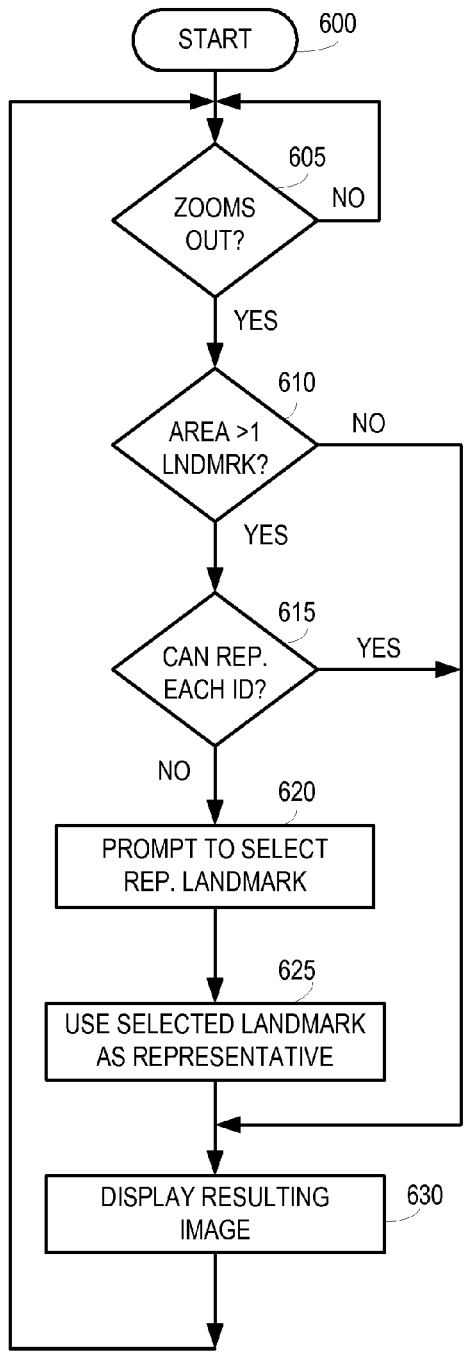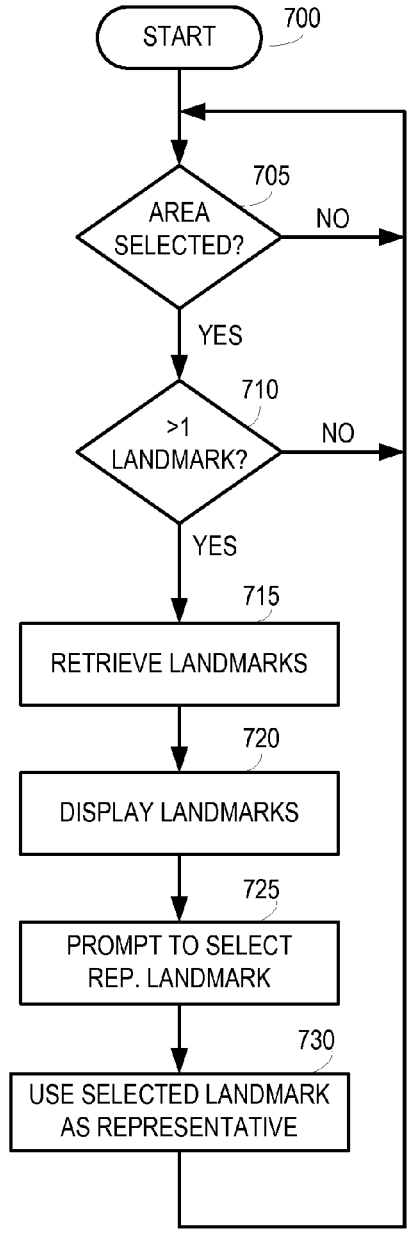
*FIG. 6*
*FIG. 7*

ENABLING A USER TO CHOOSE A REPRESENTATIVE LANDMARK TO DISPLAY AT A PARTICULAR ZOOM LEVEL ON A DIGITAL MAP

BACKGROUND

1. Technical Field

The present invention is generally directed to digital map systems. More specifically, the present invention is directed to a choice of one particular landmark to represent a plurality of landmarks in close proximity to each other when only one of the landmarks can be displayed on a particular view of a digital map.

2. Description of Related Art

Digital maps are digital images that are generated from one or more sources of map data. Since the images are digital, different resolutions of the images may be displayed at any time. For example, when the digital image is first displayed to a user, it is displayed at a first resolution. If the user decides to have a better view of the displayed image at a particular location point, the user may zoom in onto that location point. The digital image will then be expanded at that location point and displayed at a second resolution. If the user later zooms half way out from the location point, the view of the image may then be compressed and displayed at a third resolution.

When the user zooms in onto the location point, detailed information at that location point is generally displayed on the map. As an example, in the case where there is a plurality of landmarks in close proximity to each other within a geographical area, the landmarks may be represented each by a location point placed one on top of another at a particular resolution of the image. When a user zooms in on that geographical area on the map, the location points may be separated from each other on the resulting view of the digital image.

Generally, when a plurality of landmarks is represented by location points placed one on top of another on a view of a digital map, one landmark is usually chosen by the digital map designer as a representative landmark for the plurality of landmarks. If the chosen landmark is a business for example, the name of the business may be displayed on the view of the digital map at that geographical area.

Sometimes, however, a user may want a different landmark to be the representative landmark for the plurality of landmarks. For example, oftentimes users employ landmarks that are well-known to them as points of reference to orient themselves as well as to direct a person to a location (i.e., down the street from Target, across the street from Walmart or a couple of stores from Mailboxes etc.). If the representative landmark chosen by the software designer is not one that is known to the user, the user may have difficulty orienting himself or herself, for instance, when viewing the digital map.

BRIEF SUMMARY

In one embodiment of the invention, a computer system and program product for enabling a user to select a representative landmark to display at a particular zoom level on a digital map are provided. The computer system and program product comprise determining whether the user zooms out of a first view of the digital map, displaying a second view of the digital map in response to determining that the user zooms out of the first view of the digital map, the second view of the digital map being of a lower resolution than the first view of the digital map, wherein displaying the second view of the digital map includes determining whether at least one geographical area of the digital map includes at least two landmarks therein, determining, in response to determining that the at least one geographical area of the digital map includes the at least two landmarks, whether the at least two landmarks are to be displayed in the second view of the digital map in close proximity to each other wherein an identification of each one of the at least two landmarks cannot be indicated in the second view of the digital map, prompting the user to select one of the at least two landmarks to represent the at least two landmarks, and identifying the at least two landmarks on the second view of the digital map using the landmark selected by the user.

In another embodiment of the invention a computer system and program product for enabling a user to select a representative landmark to display on a digital map are provided. The computer system and program product include determining whether the user selects a geographical area on the digital map, determining, in response to determining that the user selects the geographical area, whether the selected geographical area includes at least two landmarks therein, prompting the user to select one of the at least two landmarks to represent the at least two landmarks, in response to determining that the selected geographical area includes the at least two landmarks, and representing the at least two landmarks on the digital map using the landmark selected by the user.

BRIEF DESCRIPTION OF THE SEVERAL VIEWS OF THE DRAWINGS

FIG. 6 depicts a flowchart of a representative process that implements an embodiment of the invention.

FIG. 7 depicts a flowchart of an alternate process that is used in another embodiment of the invention.

DETAILED DESCRIPTION

Figure 1:
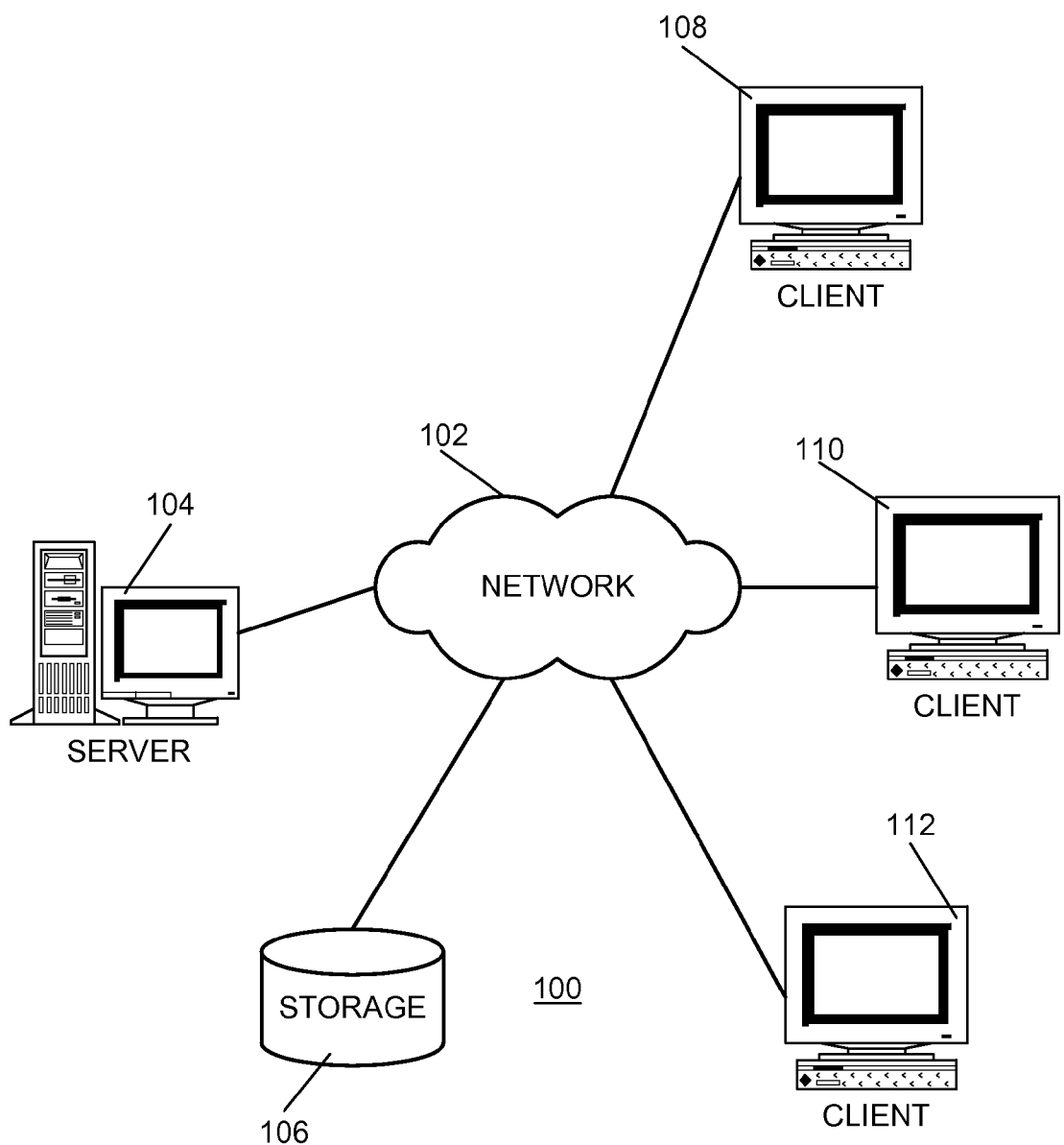
FIG. 1 is an exemplary block diagram illustrating a distributed data processing system according to an embodiment of the invention.

With reference now to the figures, FIG. 1 depicts a pictorial representation of a network data processing system 100 in which the present invention may be implemented. Network data processing system 100 contains a network 102, which is the medium used to provide communications links between various devices and computers connected together within network data processing system 100. Network 102 may include connections, such as wire, wireless communication links, or fiber optic cables etc.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108, 110 and 112. Clients 108, 110 and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another.

Figure 2:
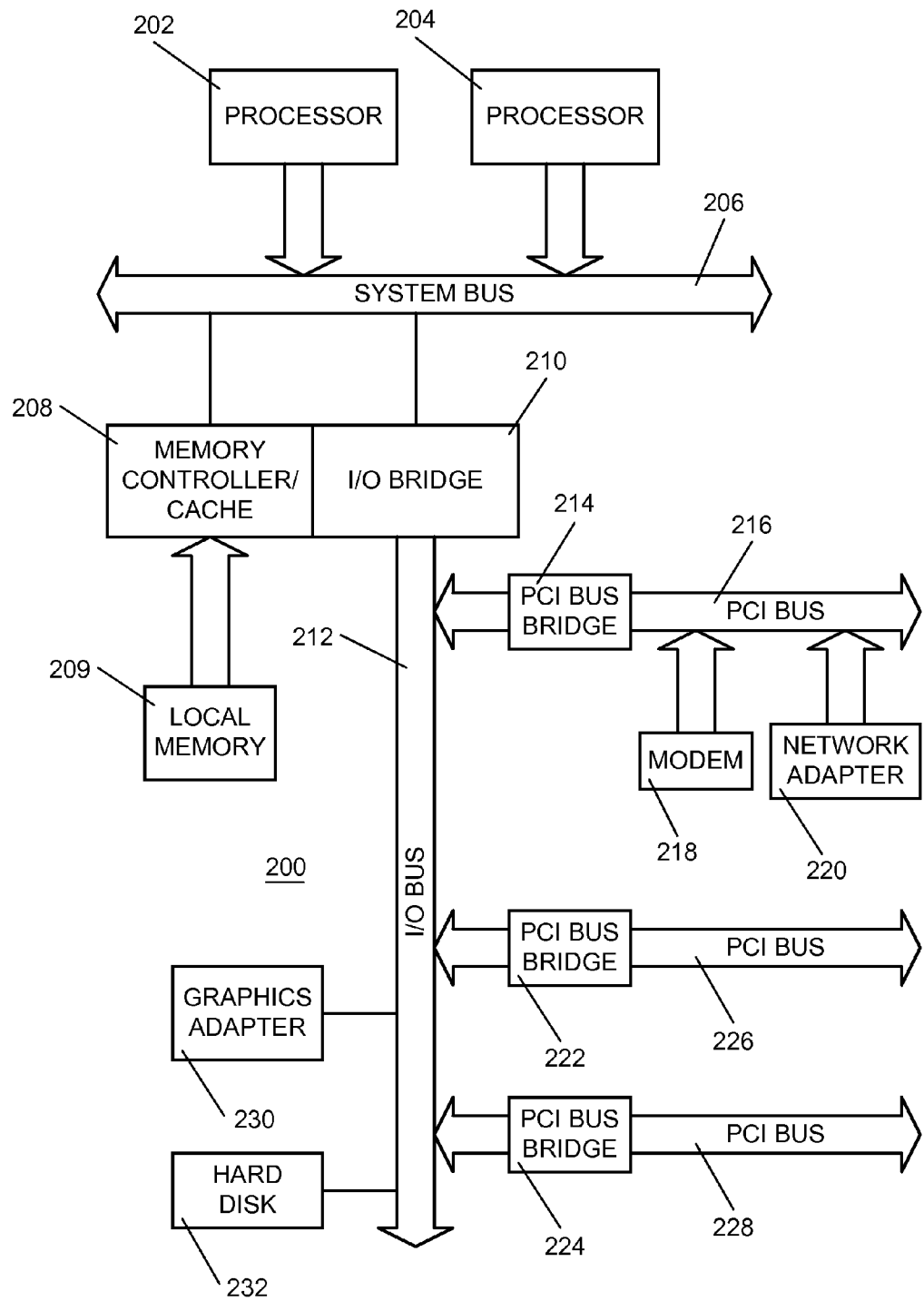
FIG. 2 is an exemplary block diagram of a server apparatus according to an embodiment of the invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to network computers 108, 110 and 112 in FIG. 1 may be provided through modem 218 and network adapter 220 connected to PCI local bus 216 through add-in boards. Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Figure 3:
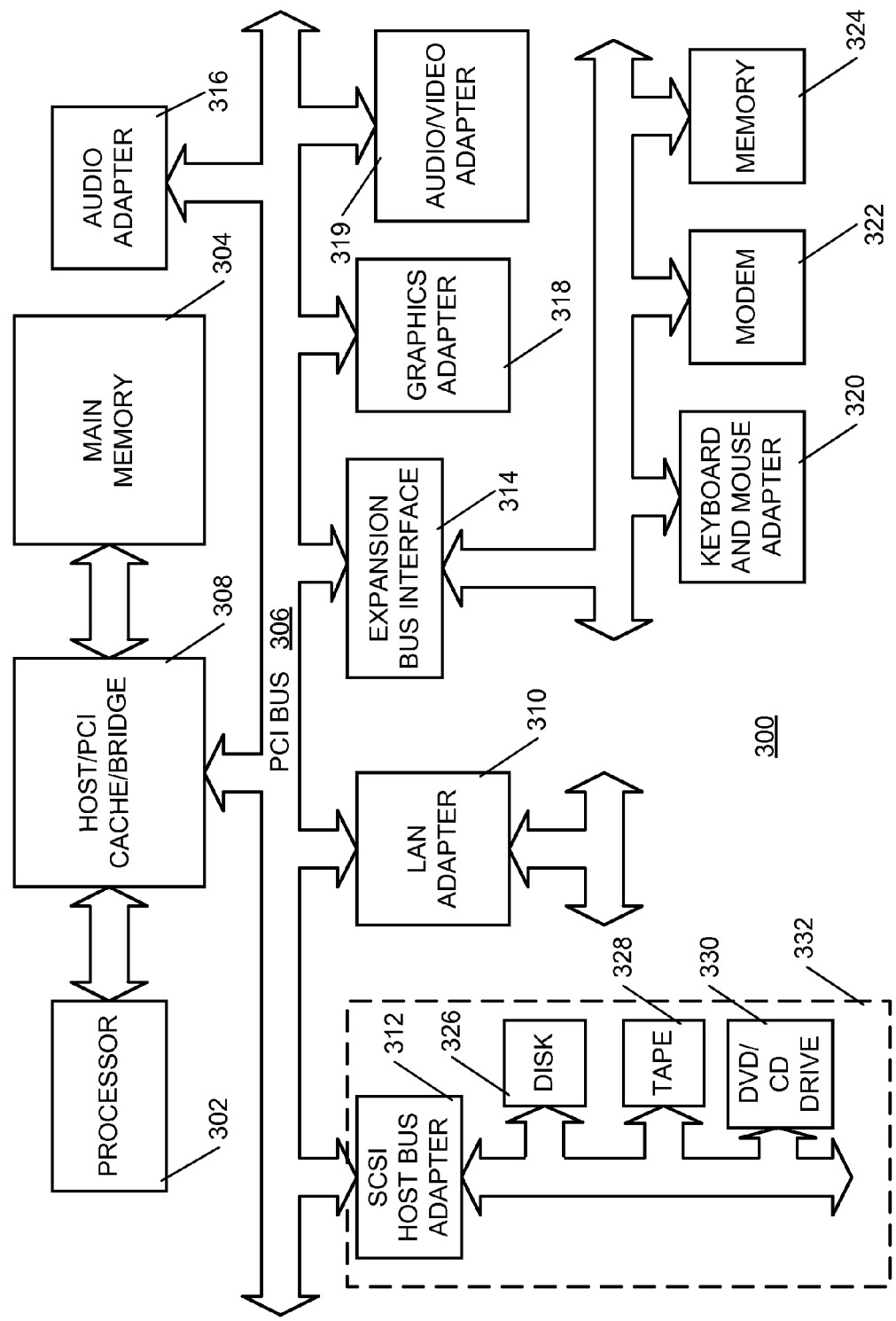
FIG. 3 is an exemplary block diagram of a client apparatus according to an embodiment of the invention.

With reference now to FIG. 3, a block diagram illustrating a data processing system is depicted in which in an embodiment of the invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, Small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and compact disk read only memory (CD-ROM) drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP®, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 may also be a notebook computer or hand held computer as well as a personal digital assistant (PDA). Further, data processing system 300 may also be a kiosk or a Web appliance.

The present invention enables a user to choose one particular landmark to represent a plurality of landmarks in close proximity to each other when only one of the landmarks can be displayed on a particular view of a digital map. The invention may be local to any one, a few or all of the clients 108, 110 and 112. Alternatively, the invention may reside on server 104, especially when the server 104 is the system that generates the digital image instead of just passing map data to a requesting client. Further, the present invention may be embodied on any data storage medium (i.e., floppy disk, compact disk, hard disk, tape, ROM, random access memory (RAM), etc.) used by a computer system.

As will be appreciated by one skilled in the art, aspects of the present invention may be embodied as a system, method or program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Note that, although the invention is shown to be used in conjunction with a conventional computer system (i.e., clients 108, 110, 112 and server 104), the invention can easily be used by any handheld device (i.e., cellular telephones, PDAs etc.) so long as the handheld system has the ability to display digital maps or images.

Figure 4A:
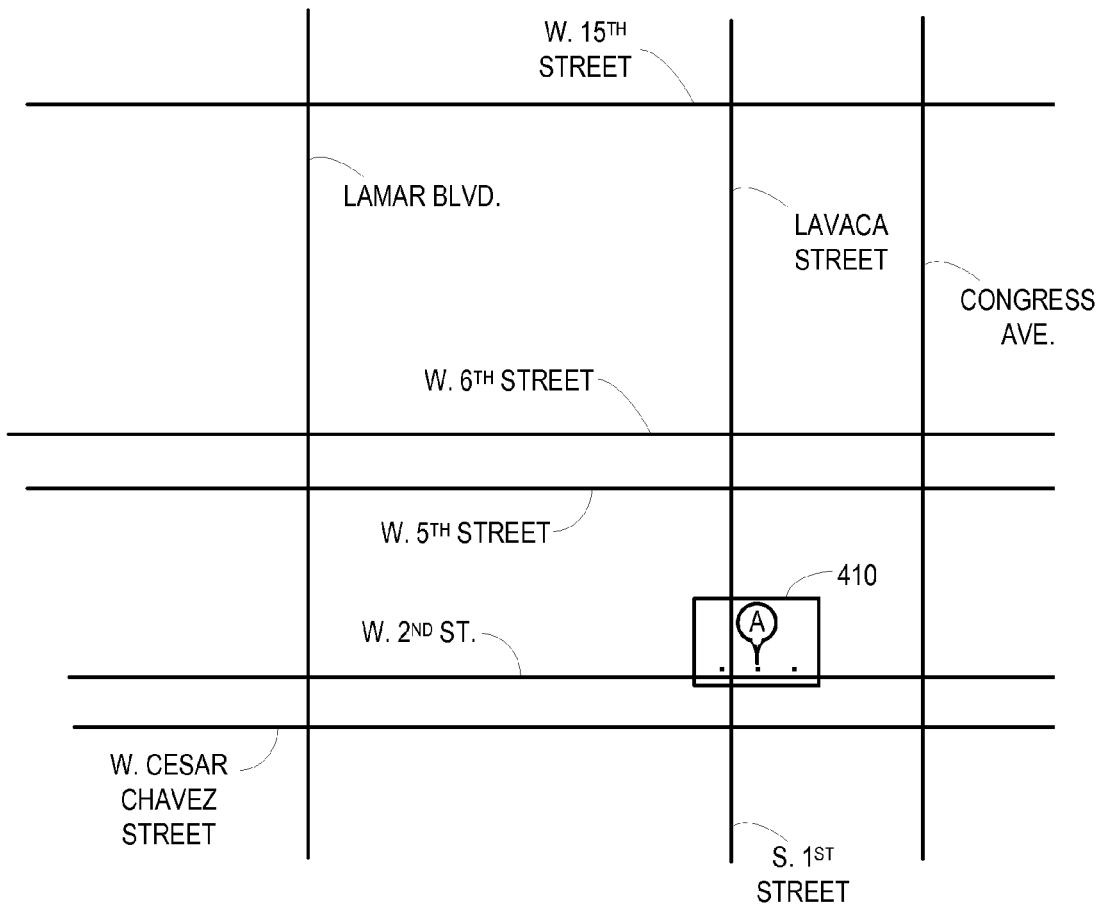
FIG. 4A depicts a digital map generated at a first resolution.

FIG. 4A depicts a digital map generated at a first resolution. The digital map is generated using Google™ Maps, Google™ Maps is a product of Google, Inc. In order not to obfuscate the disclosure of the invention, only items in the figures that are relevant to understanding the present invention will be explained. Further, note that like items throughout the several views of the invention have like numerals.

The digital map in FIG. 4A includes three location points placed very close to each other within a geographical area 410. As mentioned before, each location point in the geographical area 410 represents a landmark. Due to the resolution of the map, one landmark is used as the representative landmark for the geographical area 410. The representative landmark, which has been chosen by the designer of the map, is labeled "B". In this particular example, the landmarks are businesses and the name of the representative business is Estilo.

Figure 4B:
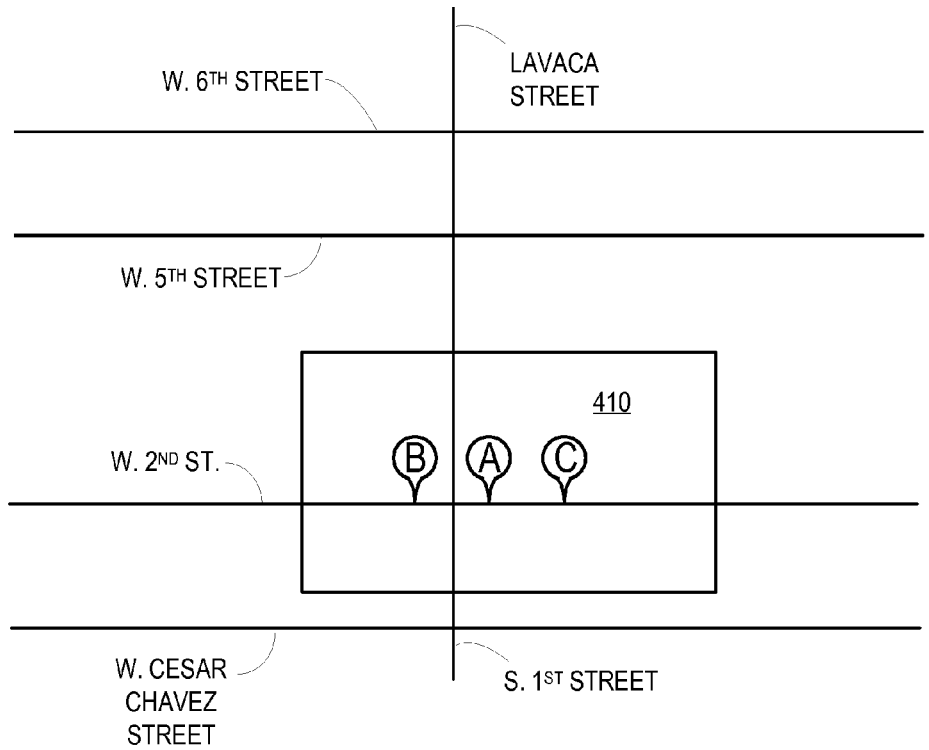
FIG. 4B depicts the digital map of FIG. 4A generated at a resolution higher than the first resolution.

FIG. 4B depicts the digital map of FIG. 4A generated at a resolution higher than the first resolution. At that resolution, the three location points are separated from each other. On this view of the digital map, the three location points are labeled landmark A, landmark B and landmark D. Landmark A represents "Estilo", landmark B represents "Runtex, Inc.", and landmark D represents: "Legs Diamond Wild Shoes".

As stated before, if a user is more familiar with "Runtex, Inc." instead of with "Estilo", the user may preferably want "Runtex, Inc." to be the representative landmark in geographical area 410 of FIG. 4A rather than "Estilo". The present invention provides a user the opportunity to select one landmark to represent a group of landmarks within a geographical area of a digital map.

Figure 5:
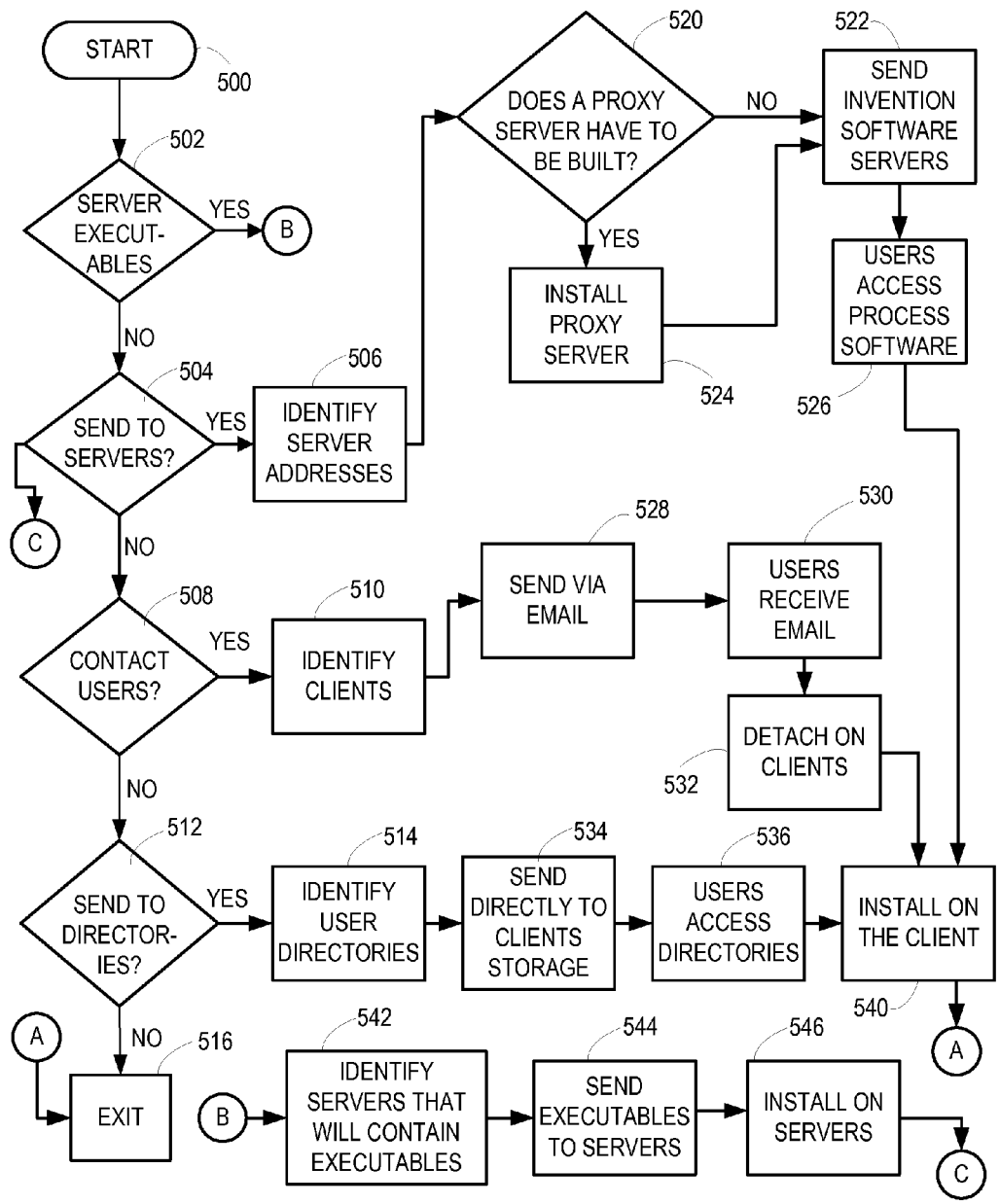
FIG. 5 depicts a flowchart of a deployment of a software process that includes an embodiment of the present invention.

FIG. 5 depicts a flowchart of a deployment of a software process that includes an embodiment of the present invention. Step 500 begins the deployment software process. The first thing is to determine if there are any programs that will reside on a server or servers when the process software is executed 502. If this is the case then the servers that will contain the executables are identified 542. The process software for the server or servers is transferred directly to the servers' storage via FTP or some other protocol or by copying through the use of a shared file system 544. The software process is then installed on the servers 546.

Next, a determination is made on whether the software process is to be deployed by having users access the software process on a server or servers 504. If the users are to access the software process on servers then the server addresses that will store the invention are identified 506. A determination is made as to whether a proxy server is to be built 520 to store the software process. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required then the proxy server is installed 524.

The software process is sent to the servers either via a protocol such as FTP or it is copied directly from the source files to the server files via file sharing 522. Another embodiment would be to send a transaction to the servers that contained the software process and have the server process the transaction, then receive and copy the software process to the server's file system. Once the software process is stored at the servers, the users via their client computers, then access the software process on the servers and copy to their client computers file systems 526. Another embodiment is to have the servers automatically copy the process software to each client and then run the installation program for the process software at each client computer. The user executes the program that installs the software process on his client computer 540 then exits the process 516.

In step 508 a determination is made as to whether the software process is to be deployed by sending the software process to users via e-mail. The set of users where the software process will be deployed are identified together with the addresses of the user client computers 510. The process software is sent via e-mail to each of the users' client computers in step 528. The users then receive the e-mail 530 and then detach the process software from the e-mail to a directory on their client computers 532. The user executes the program that installs the process software on his client computer 540 then exits the process 516.

Lastly a determination is made on whether the process software will be sent directly to user directories on their client computers 512. If so, the user directories are identified 514. The process software is transferred directly to the user's client computer directory 534. This can be done in several ways such as but not limited to sharing of the file system directories and then copying from the sender's file system to the recipient user's file system or alternatively using a transfer protocol such as File Transfer Protocol (FTP). The users access the directories on their client file systems in preparation for installing the process software 536. The user executes the program that installs the process software on his client computer 540 then exits the process 516.

FIG. 6 depicts a flowchart of a representative process that implements an embodiment of the invention. The process starts when a digital map is displayed (step 600). As is well known in the art, the digital image will be first displayed at a first resolution. Once started, the process checks to see whether the user zooms out of a location point (step 605). If not, the process returns to step 605. If the user zooms out of the location point, the map will be re-displayed at a second resolution that is lower than the first resolution. At the second resolution, landmarks in a geographical area that were previously identified on the digital map may not be identified in the re-display of the image. Thus, when redisplaying the image, the process checks to determine whether at least one geographical area on the digital map has more than one landmark contained therein (step 610). If no geographical areas have more than one landmark contained therein, the digital image is re-displayed (step 630) and the process returns to step 605.

If there is at least one geographical area in the displayed digital image that has mote than one landmark contained therein, a check is made to determine whether the landmarks can be represented in the re-display of the image with their identification (step 615). If so, the digital image is re-displayed (step 630) and the process returns to step 605.

If at least one of the landmarks cannot be represented in the re-display of the image with its identification, then the process prompts the user to select one landmark to represent the landmarks in the geographical area (step 620). In re-displaying the image (630), the process uses the selected landmark to represent the landmarks in the geographical area of the image and the process returns to step 605.

FIG. 7 depicts a flowchart of an alternate process that is used in another embodiment of the invention. The process starts when a digital map is displayed (step 700). The process then continuously checks to see whether a geographical area on the map is selected (step 705). Alternatively, the process may start upon a selection of a geographical area on the map. At that point, the system may generate an interrupt in order to go through the process of the present invention.

Note that a geographical area in this case is any area on a digital map that contains at least one location point therein. In addition, all geographical areas are delimited by two latitudinal and two longitudinal points forming either a rectangle or a square. Note further that the selection of the geographical area may occur via any one of a plurality of conventional methods (e.g., pointing a mouse pointer on the geographical area and left clicking or right clicking on the mouse, pointing a mouse pointer on the geographical area while simultaneously pressing the right or left mouse button, or dragging a mouse pointer over the geographical area while simultaneously pressing the right or left mouse button etc.)

When a geographical area on a displayed digital map is selected, a check is made to determine whether or not there is more than one point location within the geographical area (step 710). If not, the process returns to step 705. In the case of an interrupt, the process ends in order to allow the system to return to the process that was being executed prior to the interrupt. If there is more than one location point in the geographical area, the system retrieves the landmark associated with each location point (step 715). To do so, the system parses one or more databases associated with higher resolutions of the digital map. Specifically using the longitudinal and latitudinal points of the selected geographical area, the system may parse a database associated with each higher resolution of the displayed digital map until all landmarks associated with the location points in the selected geographical area on the map is retrieved.

Upon retrieving the landmarks, the system displays the landmarks to the user (step 720) and prompts the user to select a representative landmark (step 725). Once the representative landmark is selected, it will be displayed as the representative landmark whenever the resolution of the digital map is not high enough to allow all landmarks within the geographical area to be displayed. After using the selected landmark, the process returns to step 705 or ends in the case where an interrupt is used to execute the process.

Figure 8:
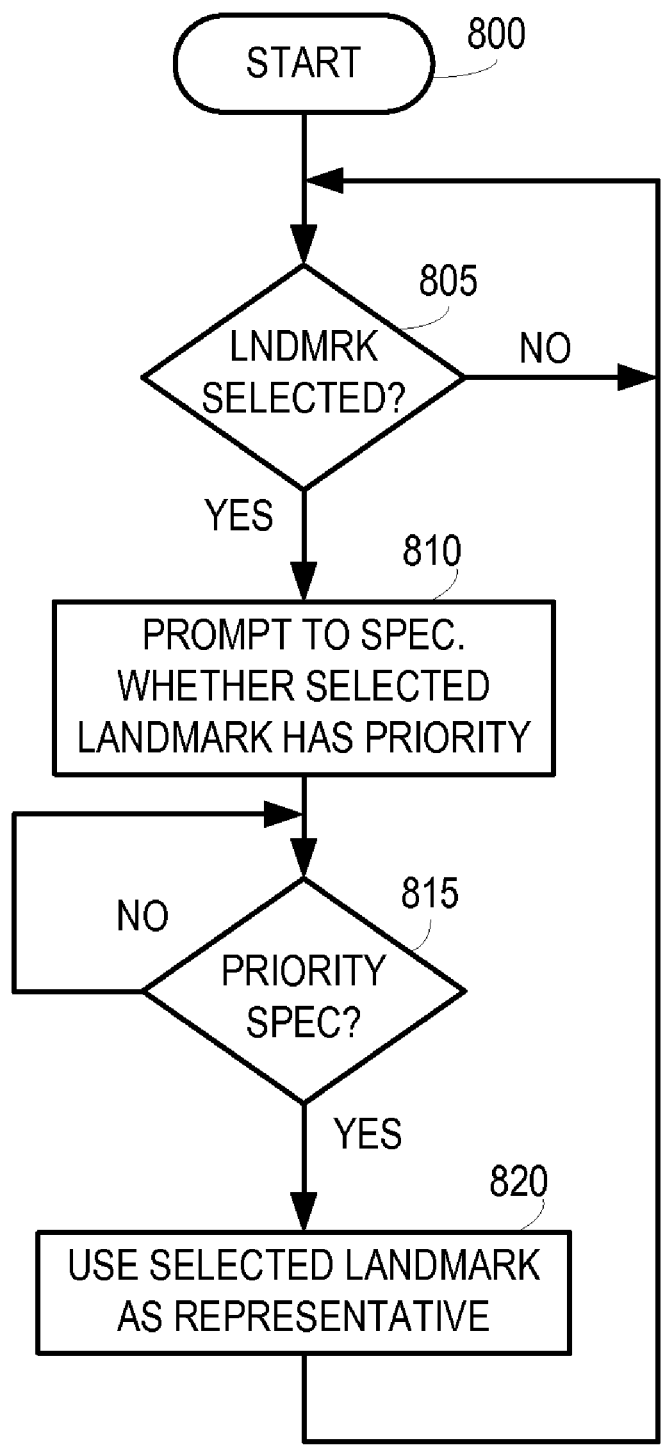
FIG. 8 depicts a flowchart of another alternate process used in yet another embodiment of the invention.

FIG. 8 depicts a flowchart of another alternate process used in yet another embodiment of the invention. The process starts when a digital map is displayed (step 800). Once started, the process checks to see whether the user has selected a landmark or location point (step 805). If not, the process returns to step 805. Otherwise, the user is prompted to specify whether the selected landmark or location point has priority in a geographical area (step 810). The process checks to determine whether the user has specified that the selected landmark or location point has priority in the geographical area (step 815). If not, the process returns to step 815. If so, the process uses the selected landmark or the landmark associated with the selected location point as the representative landmark in the geographical area (step 820) and the process returns to step 805.

In the processes outlined in FIGS. 6 to 8, a user has to select the representative landmark. However, the invention is not restricted to having the representative landmark chosen by the user. Rather, the representative landmark may automatically be selected by the system.

For example, the system may be configured such that the largest landmark in a geographical area is automatically selected as the representative landmark. The system may instead be configured such that a business with the highest total sales in the geographical area is automatically chosen as the representative landmark.

Further, a previous navigation history or a user purchase history may be used to automatically select the representative landmark. For example, in the case of a navigation history, if a previous route had been calculated to a known location and the known location is along a new route calculation, the known location may be used as the representative landmark for the geographical area on that new route. In the case of a user purchase history, more money spent at a particular business location or higher transaction volume at that particular location indicates an implicit knowledge of that business on the part of the user. Hence, the business may automatically be used as the representative landmark of the geographical area.

The representative landmark may be automatically chosen based on user preferences. For example, if a user indicates that the user is fond of MoonBucks coffee shops, if there is a MoonBucks coffee shop within the geographical area, the MoonBucks coffee shop may automatically be selected as the representative landmark.

In addition, the representative landmark may be automatically chosen based on the popularity of a location as photographed in a social photography site, or based on an event publicized in a social networking site.

Note that icons may be used to display representative landmarks instead of the text names of the landmarks. Further, symbols such as trademarks, logos etc, may be used to display the representative landmarks or scaled street view images may be used to display the representative landmarks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. For example, the landmarks may be cities, parks, schools etc. Hence, the embodiment was chosen and described in order to best explain the principles of the invention, the practical application and to enable others of ordinary skill in the art to understand the invention for various embodiments with various modifications as are suited to the particular use contemplated.

What is claimed is:

1. A program product for enabling a user to select a representative landmark to display at a particular zoom level on a digital map comprising:
   a computer readable storage device having computer readable program code embodied therewith, the computer readable program code comprising:
   computer readable code configured to determine whether the user zooms out of a first view of the digital map;
   computer readable code configured to display a second view of the digital map in response to determining that the user zooms out of the first view of the digital map, the second view of the digital map being of a lower resolution than the first view of the digital map, wherein the computer readable code configured to display the second view of the digital map includes computer readable code to:
   determine whether at least one geographical area of the digital map includes at least two landmarks therein, the digital map having respective icon, symbol, image or text name display representations for the respective at least two landmarks;
   determine, in response to determining that the at least one geographical area of the digital map includes the at least two landmarks, whether the at least two landmark representations are to be displayed in the second view of the digital map in close proximity to each other wherein an identification of each one of the at least two landmark representations cannot be indicated in the second view of the digital map;
   prompt the user to select one of the at least two landmarks to represent the at least two landmarks;
   receive a selection by the user of one of the at least two landmarks; and
   identify the at least two landmarks on the second view of the digital map using the representation for the landmark selected by the user and not a representation for the one or more others of the at least two landmarks; and
   wherein the computer readable code configured to display the second view of the digital map includes:
   computer readable code to automatically determine whether the at least two landmarks are commercial businesses, to automatically determine whether the user has had a business transaction with one of the at least two landmarks and to automatically select the landmark with which the user has had the business transaction to represent the at least two landmarks on the second view of the digital map in response to determining that the identification of each one of the at least two landmarks cannot be indicated in the second view of the digital map; and computer readable code to automatically select the landmark with which the user has had a higher transaction volume in response to determining that the user has had a business transaction with the at least two landmarks.

2. The program product of claim 1 wherein the computer readable code configured to display the second view of the digital map includes computer readable code to automatically determine a physical size of the at least two landmarks and to automatically select the landmark that is physically larger in size to represent the at least two landmarks on the second view of the digital map in response to determining that the identification of each one of the at least two landmarks cannot be indicated in the second view of the digital map.

3. The program product of claim 1 wherein the computer readable code configured to display the second view of the digital map includes computer readable code to automatically determine whether the at least two landmarks are commercial businesses and to automatically select the landmark that has a higher total sale of the at least two landmarks to represent the at least two landmarks on the second view of the digital map in response to determining that the identification of each one of the at least two landmarks cannot be indicated in the second view of the digital map.

4. The program product of claim 1 wherein the computer readable code configured to display the second view of the digital map includes computer readable code to automatically determine whether the digital map is being used for navigation purposes, to automatically determine whether one of the at least two landmarks is a location known from a previous navigation calculation of the user and to automatically select the landmark that is the known location to represent the at least two landmarks on the second view of the digital map in response to determining that the identification of each one of the at least two landmarks cannot be indicated in the second view of the digital map.

5. A program product for enabling a user to select a representative landmark to display on a digital map comprising:

a computer readable storage device having computer readable program code embodied therewith, the computer readable program code comprising:

computer readable code configured to determine whether the user selects a geographical area;

computer readable code configured to determine, in response to determining that the user selects the geographical area, whether the selected geographical area includes at least two landmarks therein;

computer readable code configured to represent each of the respective at least two landmarks on the digital map as a respective icon, symbol, image or text name;

computer readable code configured to prompt the user to select one of the at least two landmarks to represent the at least two landmarks, in response to determining that the selected geographical area includes the at least two landmarks;

computer readable code configured to receive a selection by the user of one of the at least two landmarks, wherein the others of the at least two landmarks are not selected; and computer readable code configured to represent the at least two landmarks on the digital map using the representation for the landmark selected by the user and not a representation for the one or more others of the at least two landmarks; and wherein the computer readable code configured to determine whether the selected geographical area includes at least two landmarks therein includes:

computer readable code to automatically determine whether the at least two landmarks are commercial businesses, to automatically determine whether the user has had a business transaction with one of the at least two landmarks and to automatically select the landmark with which the user has had the business transaction to represent the at least two landmarks in response to determining that the identification of each one of the at least two landmarks cannot be indicated in the second view of the digital map; and computer readable code to automatically select the landmark with which the user has had a higher transaction volume in response to determining that the user has had a business transaction with the at least two landmarks.

6. The program product of claim 5 wherein the computer readable code configured to determine whether the selected geographical area includes at least two landmarks therein includes computer readable code to automatically determine a physical size of the at least two landmarks and to automatically select the landmark that is physically larger in size to represent the at least two landmarks.

7. The program product of claim 5 wherein the computer readable code configured to determine whether the selected geographical area includes at least two landmarks therein includes computer readable code to automatically determine whether the at least two landmarks are commercial businesses and to automatically select the landmark that has a higher total sale of the at least two landmarks to represent the at least two landmarks.

8. The program product of claim 5 wherein the computer readable code configured to determine whether the selected geographical area includes at least two landmarks therein includes computer readable code to automatically determine whether the digital map is being used for navigation purposes, to automatically determine whether one of the at least two landmarks is a location known from a previous navigation calculation of the user and to automatically select the landmark that is the known location to represent the at least two landmarks.

9. A method in a computer system for enabling a user to select a representative landmark to display on a digital map comprising:

determining whether the user selects a geographical area;

determining, in response to determining that the user selects the geographical area, whether the selected geographical area includes at least two landmarks therein, the computer system being configured to represent each of the respective at least two landmarks on the digital map as a respective icon, symbol, image or text name;

prompting the user to select one of the at least two landmarks to represent the at least two landmarks, in response to determining that the selected geographical area includes the at least two landmarks;

receiving, by the computer system, a selection from the user of one of the at least two landmarks, wherein the others of the at least two landmarks are not selected; and representing the at least two landmarks on the digital map by the computer system using the representation for the landmark selected by the user and not a representation for the one or more others of the at least two landmarks,
wherein determining whether the selected geographical area includes at least two landmarks therein includes:
automatically determining whether the at least two landmarks are commercial businesses;
automatically determining whether the user has had a business transaction with one of the at least two landmarks; and
automatically selecting the landmark with which the user has had the business transaction to represent the at least two landmarks in response to determining that the identification of each one of the at least two landmarks cannot be indicated in the second view of the digital map; and
wherein the method includes:
automatically selecting the landmark with which the user has had a higher transaction volume in response to determining that the user has had a business transaction with the at least two landmarks.

10. The method of claim 9, wherein determining whether the selected geographical area includes at least two landmarks therein includes:
determining a physical size of the at least two landmarks and automatically selecting the landmark that is physically larger in size to represent the at least two landmarks.

11. The method of claim 9, wherein determining whether the selected geographical area includes at least two landmarks therein includes:
automatically determining whether the at least two landmarks are commercial businesses and automatically selecting the landmark that has a higher total sale of the at least two landmarks to represent the at least two landmarks.

12. The method of claim 9 wherein determining whether the selected geographical area includes at least two landmarks therein includes:
automatically determining whether the digital map is being used for navigation purposes;
automatically determining whether one of the at least two landmarks is a location known from a previous navigation calculation of the user; and
automatically selecting the landmark that is the known location to represent the at least two landmarks.

13. A computer system comprising:
at least one storage system for storing a digital map program; and
at least one processor for processing the digital map program, the system being configured with the program and the at least one processor to display a digital map, to determine whether a user selects a geographical area on the displayed digital map, to determine, in response to determining that the user selects the geographical area, whether the selected geographical area includes at least two landmarks therein;
the system being configured with the program and the at least one processor to represent each of the respective at least two landmarks on the digital map as a respective icon, symbol, image or text name;
the system being configured with the program and the at least one processor to prompt the user to select one of the at least two landmarks to represent the at least two landmarks, in response to determining that the selected geographical area includes the at least two landmarks, and to receive a selection by the user of one of the at least two landmarks, wherein one or more landmarks of the at least two landmarks are not selected; and
the system being configured with the program and the at least one processor to represent the at least two landmarks on the digital map using the representation for the landmark selected by the user and not a representation for the one or more others of the at least two landmarks; and
the system being configured with the program and the at least one processor to automatically determine whether the at least two landmarks are commercial businesses, to automatically determine whether the user has had a business transaction with one of the at least two landmarks and to automatically select the landmark with which the user has had the business transaction to represent the at least two landmarks; and
the system being configured with the program and the at least one processor to automatically select the landmark with which the user has had a higher transaction volume in in response to determining that the user has had a business transaction with the at least two landmarks.

14. The computer system of claim 13 wherein the digital map program is processed to automatically determine a physical size of the at least two landmarks and to automatically select the landmark that is physically larger in size to represent the at least two landmarks.

15. The computer system of claim 13 wherein the digital map program is processed to automatically determine whether the at least two landmarks are commercial businesses and to automatically select the landmark that has a higher total sale of the at least two landmarks to represent the at least two landmarks.

16. The computer system of claim 13 wherein the digital map program is processed to automatically determine whether the digital map is being used for navigation purposes, to automatically determine whether one of the at least two landmarks is a location known from a previous navigation calculation of the user and to automatically select the landmark that is the known location to represent the at least two landmarks.

* * * * *